Patented June 4, 1946

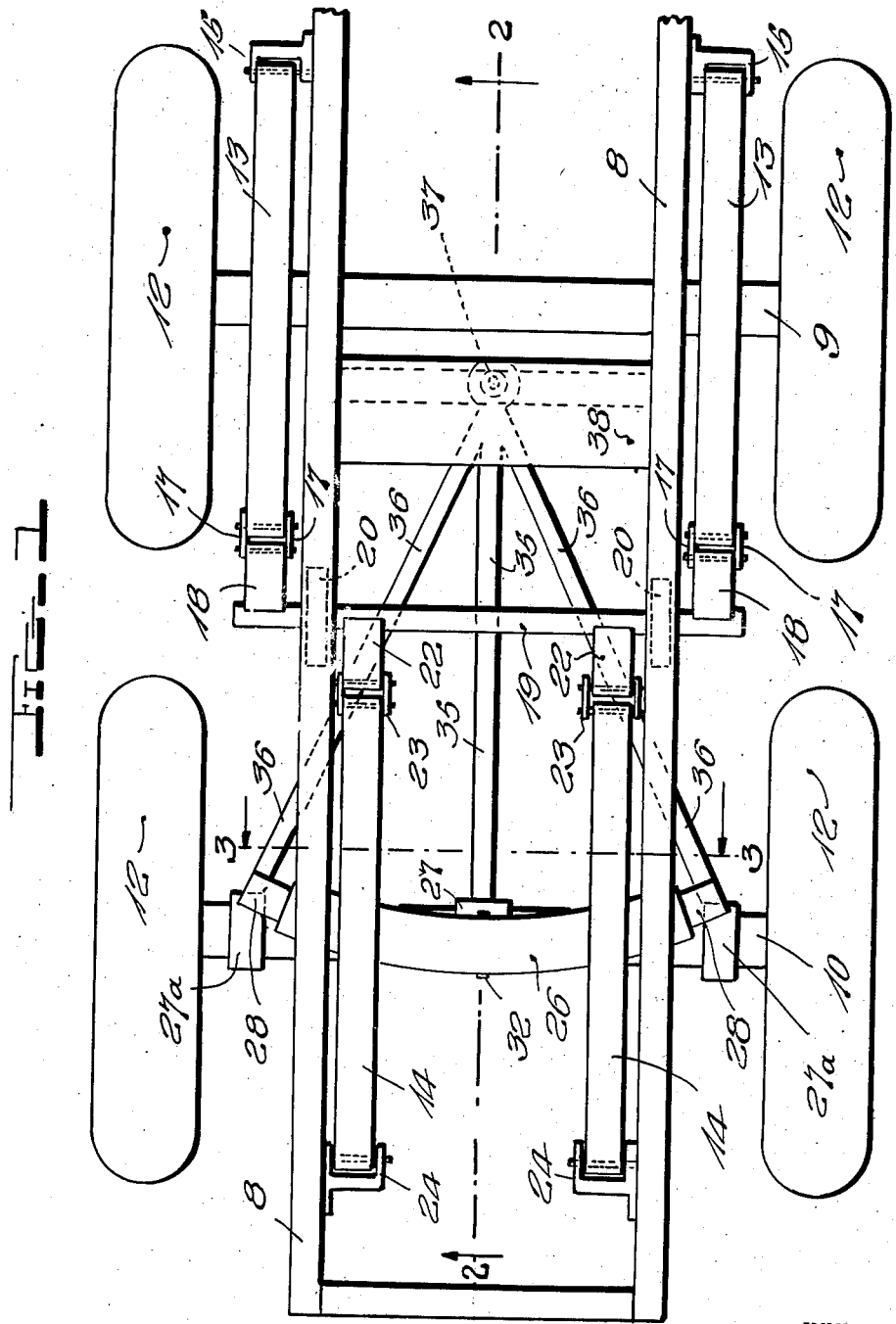

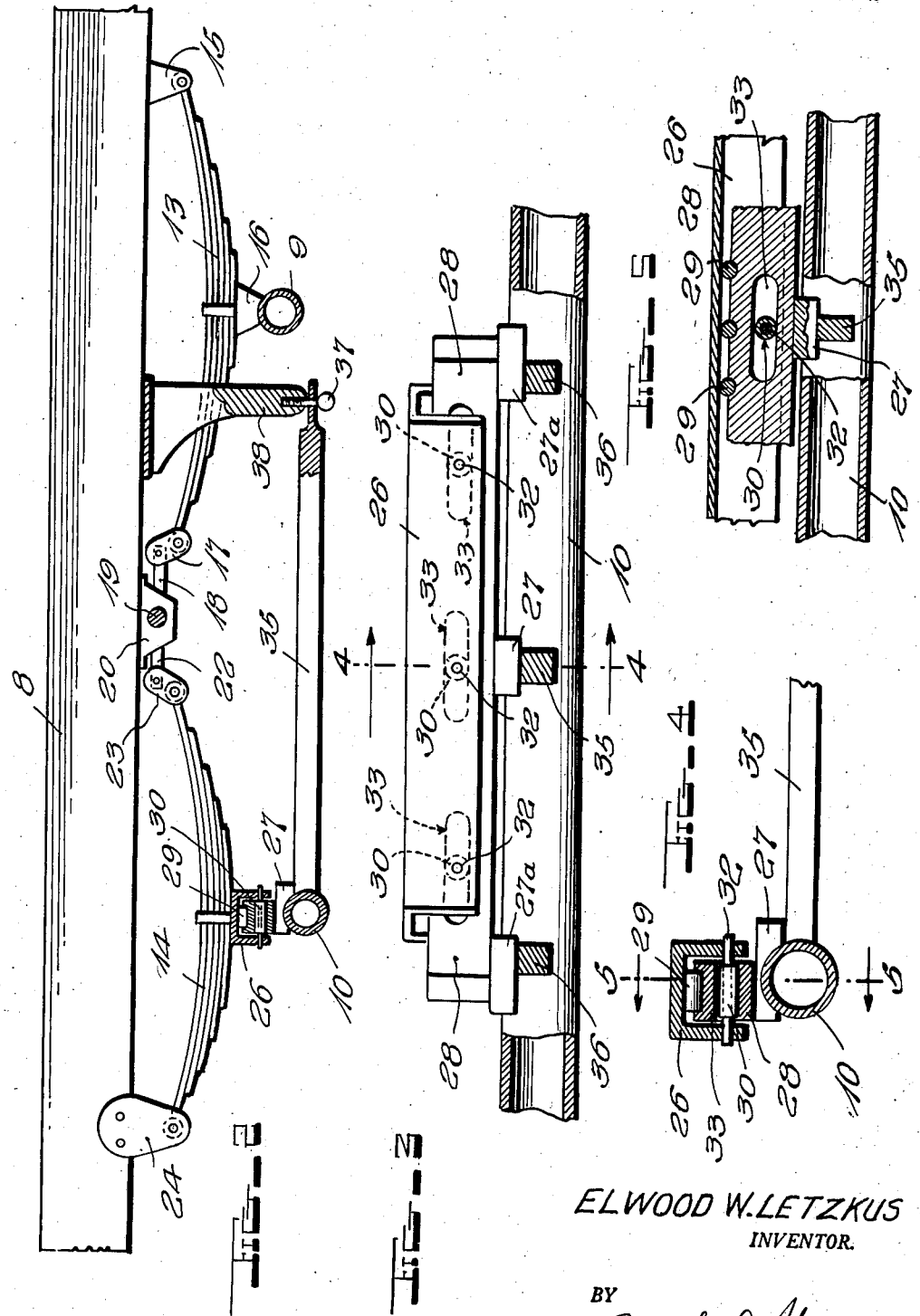

2,401,687

UNITED STATES PATENT OFFICE 2,401,687

TANDEM AXLE VEHICLE

Elwood W. Letzkus, Salem, Ohio

Application June 27, 1944, Serial No. 542,400

7 Claims. (Cl. 280—104.5)

This invention relates to multi-wheel vehicles, and particularly to those of the type having a pair of tandem axles at the rear.

The primary object of the present invention is to devise an arrangement of closely spaced tandem axles in which the wheels supporting said axles will "track" properly with respect to the front dirigible wheels, so as to avoid drag and scuffing of the tires as well as excessive wear and tear on the elements of the suspension.

My invention is chiefly concerned with obtaining accurate tracking of the rear axle of a tandem pair, and although this object is not broadly new, it has never been successfully attained, due to lack of proper load distribution upon that axle in such manner that the axle can shift axially, sideways of the vehicle, with relative freedom and without the introduction of damaging stresses and strains. In this connection, it is an object to utilize a multiple beam or compensating form of suspension in which the rearmost axle of the tandem pair is connected to the springs (beams) at points inside the longitudinal frame members of the chassis.

Preferably, the rearmost axle of the tandem pair is universally connected to the forward axle or to the chassis at a point adjacent the forward axle, and I have found that the best tracking action is obtained when the universal connection is made just behind the center of the forward axle. This arrangement, then, becomes another very important object of my invention.

The foregoing and other objects of the present invention should clearly appear from a study of the following detailed description when taken in conjunction with the accompanying drawings. In the drawings:

Fig. 1 represents a plan view of a portion of a vehicle chassis embodying my invention. As illustrated it is the rear end of a truck or trailer, with both axles "idle," but it might comprise a driven and an idle axle, and in any case the pair of axles might be disposed anywhere, longitudinally of the frame.

Fig. 2 is a cross-sectional view taken substantially along the plane of the line 2—2 in Fig. 1.

Fig. 3 is a vertical section taken approximately upon the plane of line 3—3, Fig. 1, the springs being omitted.

Fig. 4 represents a vertical section taken upon the plane of line 4—4, Fig. 3.

Fig. 5 is another vertical section, on the plane of line 5—5, Fig. 4, with the axle omitted.

With continued reference to the drawings, a conventional chassis frame 8 is disposed above a pair of tandem axles 9 and 10, supported by a plurality of wheels 12. A load equalizing form of suspension comprising two pairs of beams 13, 14 (preferably spring leaf assemblies) is interposed between the axles and the frame and connected thereto as follows.

The beams 13 are pivoted at their forward ends on the outside of the frame at 15, secured intermediate their ends to the axle 9 by brackets 16, and connected at their rear ends by shackles 17 to a pair of bars 18 that are welded or otherwise secured to a cross-trunnion 19. The latter is journaled in a pair of blocks 20 that are secured to the frame at points substantially midway between the axles. A second set of bars, 22, are secured to the trunnion at points inside the frame channels and connected by shackles 23 to the front ends of the springs 14, the rear ends of which are pivoted on the frame at 24. Except for disposition of the springs 14 inside the longitudinal channels, all of the above is substantially conventional.

The spring beams 14 are connected to the rear axle 10 by means comprising: an arcuate track 26, of inverted U-shape secured in any suitable manner to the springs; an arcuate rail 28 complemental to the track and secured to several lugs 27, 27ª, which in turn are welded to the axle; a plurality of bearing rolls 29, disposed in grooves, between the rail and the top wall of the track; and several guide rollers 30 carried in slots 33 in the rail and having integral pins 32 journaled in the side walls of the track. Preferably, there are three slots and three groups of rollers, to distribute the load upon the ends and the center portion of the axle.

The load is applied downwardly from springs to axle chiefly through the rollers 29, which act directly against the rail 28, the latter in turn transmitting the thrust directly to the axle lugs 27, 27ª. The rollers may transmit part of the load, and their pins 32 serve to prevent separation of springs and axle as well as to cooperate in limiting lateral movement in either direction of the rail with respect to the track. Normally, when the vehicle is traveling a straight path, the rollers 30 are midway between the ends of their respective slots 33, and they engage the ends of the slots to limit lateral swinging (tracking) of the axle only when the vehicle is rounding a relatively sharp curve at relatively high speed.

The arcuate rail and its complemental track have such radius as to permit the rear axle to swing about a point (37) just behind the center of the forward axle. This relationship is maintained by a central radius rod 35 and two wishbone radius rods 36, welded at their rear ends to the rear ends to the rear axle and its attached lugs 27, 27ᵃ, and joined at their front ends in an apex that is universally connected to the frame by a ball-headed pin 37. The pin 37 is screwed into a depending cross-member 38 of the framework.

It should be understood that the radius rods might be connected to a central rearward bracket on the axle instead of to the frame (or to the differential housing in case the forward axle is driven); and that in the case of a dual drive, a torque tube between the two differential housings can take the place of the radius rod 35.

Further, the rods 35, 36 also serve as torque rods when brakes are applied to the wheels of a rear trailing axle. In this connection, disposition of the spring beams 14 inside the side frame members serves to permit the addition of braking equipment at the axle ends without interfering with free lateral swinging of the rear axle relative to its track 26.

The operation should now be fairly clear. Both axles are permitted to rise and fall and tilt freely, no interference being offered by the mechanism added to facilitate tracking of the wheels. In response to road curvatures and unevenness and shifting load the rear axle is permitted to swing laterally about the vertical axis of the pin 37, the rail 28 shifting with the axle 10 while the track 26 is held always in its illustrated position by the beams 14. This sliding lateral movement is facilitated by the rollers 29 and 30, which also serve to distribute the load properly upon the axle.

Obviously, changes may be made within the scope of the invention, and therefore I wish to be limited, as is customary, only by reasonably liberal interpretation of the appended claims.

What is claimed is:

1. In a vehicle comprising a chassis frame having tandem wheel-supported axles disposed therebeneath, the frame embodying longitudinal side members adjacent the axle ends, a longitudinally arranged suspension for mounting said frame relative to said axles, guide means upon the rearmost axle to permit it to shift transversely of the vehicle, said suspension connected to said guide means at points located inside said longitudinal frame members.

2. In the vehicle defined in claim 1, said suspension being supported by the forward axle at points outside of said longitudinal frame members.

3. In a vehicle embodying a frame and a rear axle disposed below one end thereof, a suspension connected to said frame, and means for connecting said suspension to said rear axle, said means comprising an arcuate channel in the form of a guide track and a complemental arcuate rail nested therein, directly above said rear axle and extending substantially from end to end thereof, both horizontally disposed with one attached to said suspension and the other attached to the axle, and anti-friction means associated with said track and rail to facilitate relative sliding movement therebetween.

4. In the combination defined in claim 3, said anti-friction means serving to transmit the load from suspension to substantially all portions of the axle, and means for limiting the extent of relative sliding movement in both endwise directions between the track and the rail.

5. In a vehicle having a frame and a pair of closely spaced axles beneath said frame, suspension mechanism connected to said frame and to the forward axle, an arcuate track in the form of an inverted channel connected to said mechanism and disposed adjacent to and extending from end to end of the rear axle of the pair, an arcuate rail slidably disposed within said channel and secured to the rear axle, a plurality of rollers disposed between said rail and the top of said channel, and means preventing vertical separation of said bar and said channel while permitting the former to oscillate endwise within the latter.

6. In the combination defined in claim 5, said preventing means comprising a plurality of lateral slots through said rail, and a corresponding plurality of rollers disposed in said slots and having their ends projecting into the side walls of said channel.

7. In a vehicle having a framework with a pair of tandem axles disposed beneath a portion thereof and suspension mechanism for connecting said axles to said framework, means attaching the forward axle to said mechanism for substantially vertical and tilting movements only, and guide means connecting the rearward axle to said mechanism with capacity for an additional endwise movement laterally of the frame, said guide means comprising an arcuate rail secured to said rearward axle with its center of radius located adjacent the center of the forward axle, said rail having radial grooves in its top surface and rollers disposed in said grooves, an arcuate track member of inverted channel shape slidably receiving said rail and attached to the suspension mechanism, and means interconnecting said rail and said track member.

ELWOOD W. LETZKUS.